United States Patent [19]

Granetzke et al.

[11] 4,381,816
[45] May 3, 1983

[54] SELF-DRAINING HEAT EXCHANGER

[75] Inventors: Dennis C. Granetzke; Neal A. Cook, both of Racine, Wis.

[73] Assignee: Modine Manufacturing Company, Racine, Wis.

[21] Appl. No.: 200,049

[22] Filed: Oct. 23, 1980

[51] Int. Cl.³ .............................................. B60H 1/00
[52] U.S. Cl. ....................................... 165/40; 126/420
[58] Field of Search ............. 165/134 R, 40; 126/420; 137/59, 107

[56] References Cited

U.S. PATENT DOCUMENTS

| | | | |
|---|---|---|---|
| 1,863,437 | 6/1932 | Collier | 165/134 X |
| 2,791,228 | 5/1957 | Carr et al. | 137/107 |
| 3,990,504 | 11/1976 | Kolthoff, Jr. | 165/40 |
| 4,191,166 | 3/1980 | Saarem et al. | 126/420 |
| 4,305,379 | 12/1981 | Saunders | 126/420 |
| 4,307,707 | 12/1981 | Stewart | 126/420 |
| 4,309,982 | 1/1982 | Oquidam | 126/420 |

Primary Examiner—William E. Tapolcai
Attorney, Agent, or Firm—Wood, Dalton, Phillips, Mason & Rowe

[57] ABSTRACT

A self-draining heat exchanger that is particularly adaptable in solar heat systems that drains automatically when the flow of liquid such as water is interrupted. The exchanger includes a plurality of tubes arranged for sequential flow of liquid therethrough with drainage valve means that are held closed by the inflowing liquid and that are opened by the weight of the liquid within the heat exchanger when this flow is interrupted to drain the liquid containing parts of the heat exchanger.

6 Claims, 10 Drawing Figures

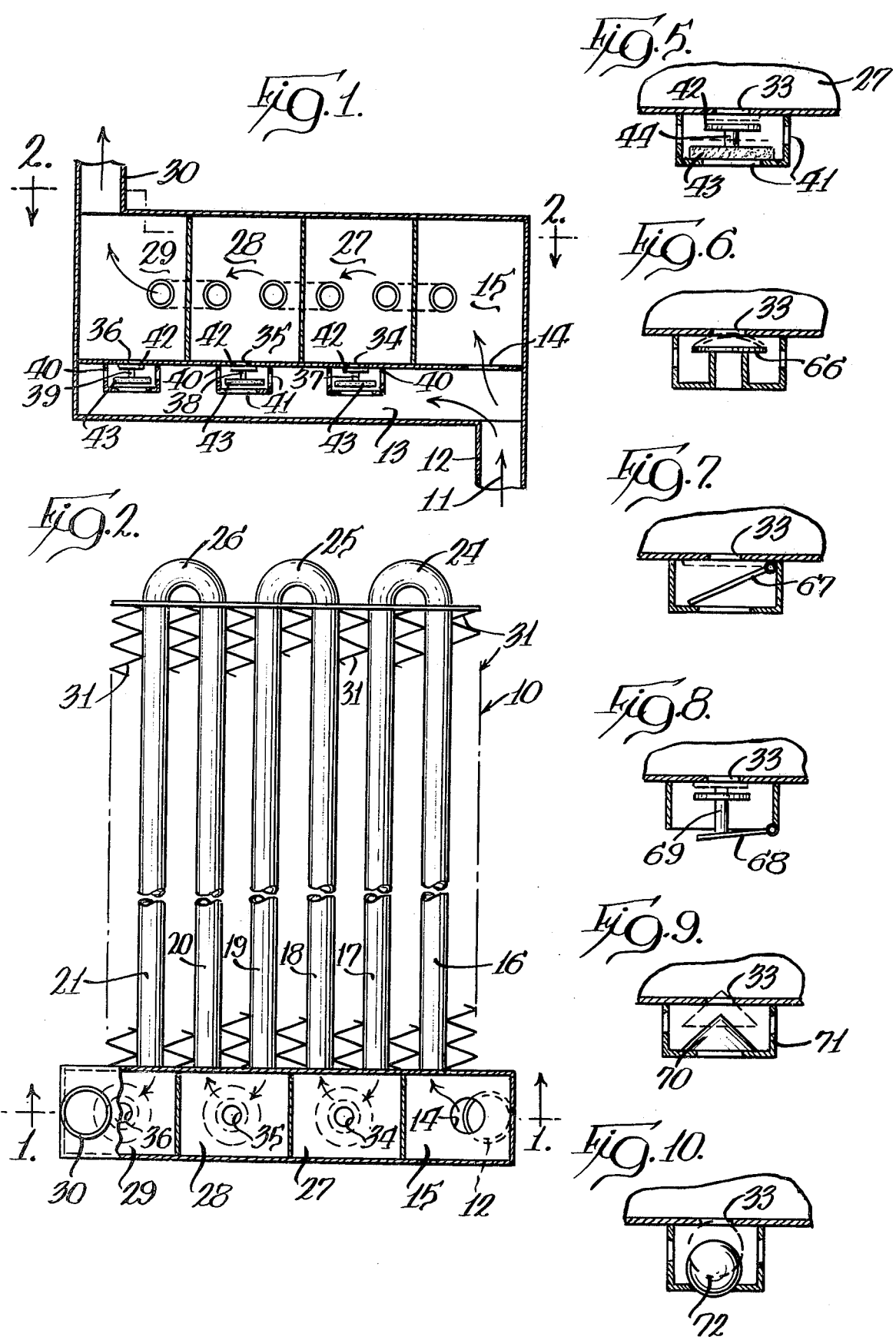

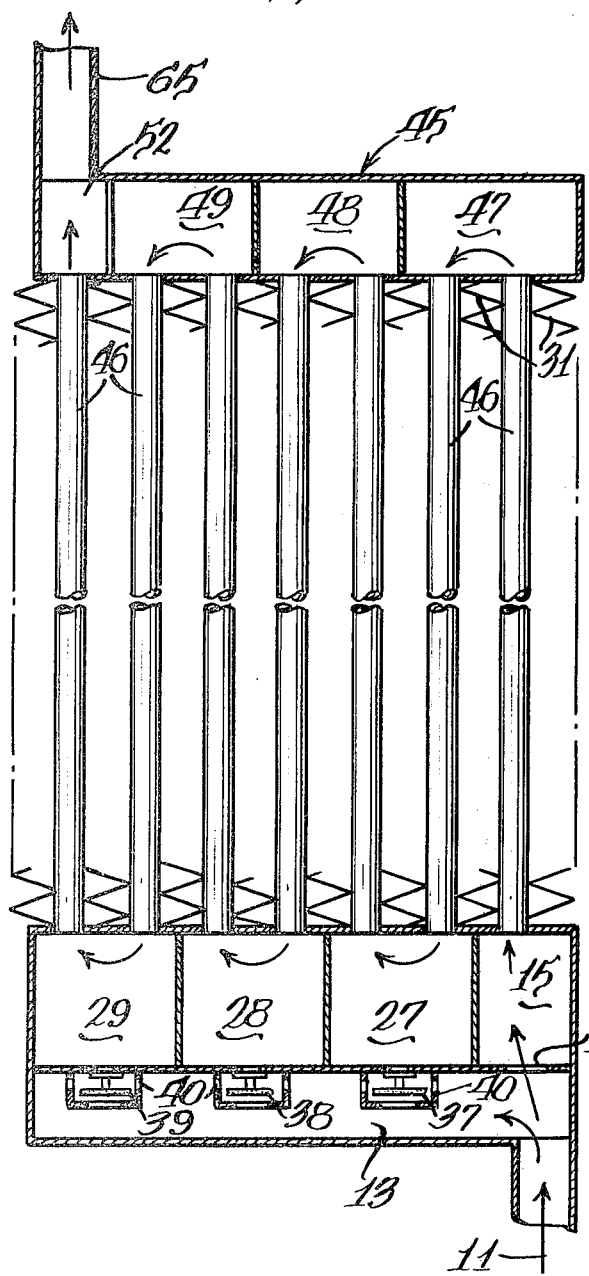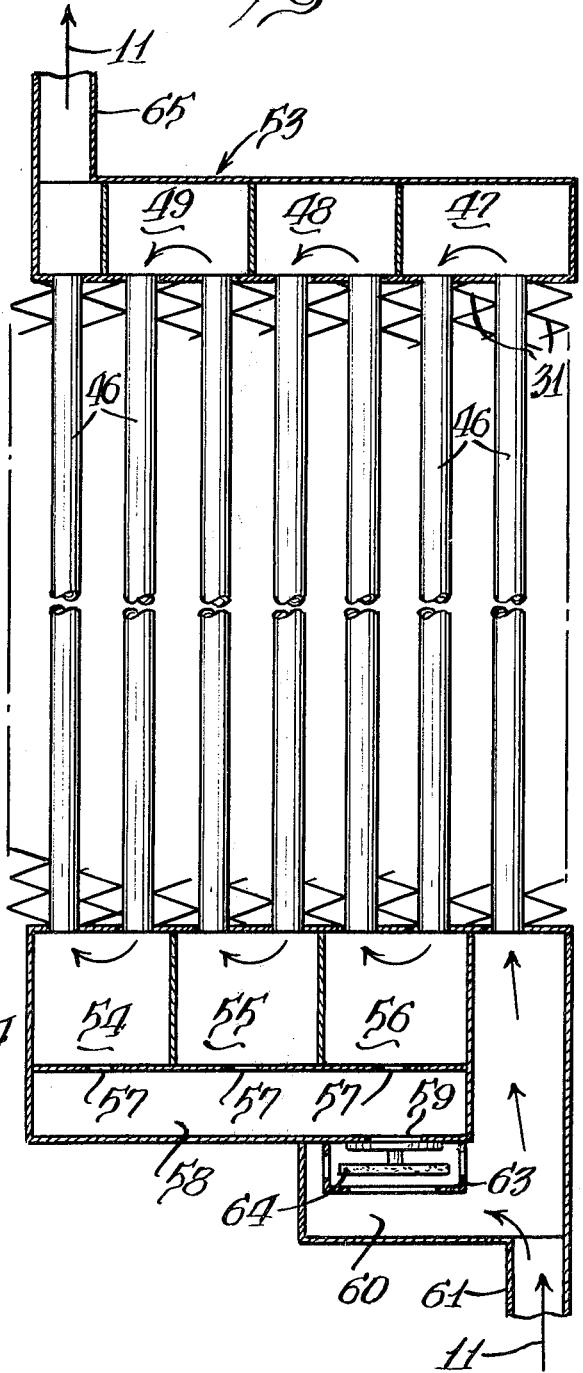

SELF-DRAINING HEAT EXCHANGER

BACKGROUND OF THE INVENTION

In certain installations such as a solar heat system in which water is used as the heat transfer medium there is always danger of freeze-up when the flow of water through the heat exchanger is stopped with entrapped water in the heat exchanger. This invention provides a system where the heat exchanger is self-draining when the flow of liquid is interrupted for any reason with the result that there is no danger of this freeze-up. The self-draining feature is, of course, applicable to other heat exchanger systems using a liquid in which it is desirable to drain the liquid containing portion of the system including the heat exchanger automatically when flow of liquid through the system is interrupted either intentionally or accidentally.

One of the features of this invention therefore is to provide a self-draining heat exchanger having a liquid containing part for a heat exchange liquid together with automatic valve means functioning to direct the liquid through its proper path in the system when liquid flow is set up but which opens automatically when liquid flow is interrupted to drain the liquid containing portions of the system using the weight of the liquid to open the valve means.

BRIEF DESCRIPTION OF THE DRAWINGS

FIG. 1 is a sectional view taken substantially along line 1—1 of FIG. 2 illustrating a first embodiment of the invention.

FIG. 2 is a sectional view taken substantially along line 2—2 of FIG. 1 with FIGS. 1 and 2 illustrating a first embodiment of the invention in which the heat exchanger is generally horizontal.

FIG. 3 is a side elevational view partly in section of a heat exchanger illustrating a second embodiment of the invention with the heat exchanger here being vertical.

FIG. 4 is a view similar to FIG. 3 but illustrating a third embodiment of the invention.

FIGS. 5-10 are detail sectional views illustrating different embodiments of automatic valves of the invention with FIG. 5 illustrating the embodiment shown in FIGS. 1-4.

DESCRIPTION OF THE PREFERRED EMBODIMENTS

In the first embodiment of FIGS. 1, 2 and 5, the heat exchanger 10 comprises flow means for a heat exchange liquid 11 such as water in a solar heat recovery system. The flow means comprises a liquid inlet means or pipe 12 leading to a manifold 13 which in turn leads through an orifice 14 to a first liquid flow chamber 15 that empties into a heat exchanger tube 16 in a series of parallel tubes 17, 18, 19, 20 and 21. The first tube 16 communicates at one end with the first flow chamber 15 and at the opposite end by a reverse flow elbow 24 to the adjacent end of the next tube 17. The first and second tubes 16 and 17 are connected in this manner while the next pair of tubes 18 and 19 are connected by a similar elbow 25 and the next pair of tubes 20 and 21 are connected by a similar elbow 26.

The opposite ends of the tubes 17 and 18 are interconnected through a second liquid flow chamber 27 and the next set of tubes 19 and 20 are interconnected through a third chamber 28. The last tube 21 in the series empties into an exit chamber 29 from which extends an outlet liquid means or pipe 30.

In the illustrated embodiment the adjacent pairs of tubes 16–21 are interconnected by serpentine fins 31 in the usual manner for aid in heat transfer between the liquid such as water flowing in sequential flow through the tubes 16–21 and air flowing over and between the tubes 16–21.

The chambers 27, 28 and 29 are provided with valve orifices 34, 35 and 36, respectively, which comprise reverse flow means adjacent to the inlet means 12 for flow of liquid from the heat exchanger into and back through the inlet means 12 when liquid flow 11 is interrupted. In order to provide this each of the orifices 34-36 is provided with a closure valve 37, 38 and 39 each held in a cage 40 located in the manifold 13. Each cage 40 has bottom and side openings 41 to permit liquid flow between the chambers 27–29 and the manifold 13 and of course the inlet pipe 12 under the proper conditions as will be described.

Each valve 37-39 includes a valve portion 42 normally covering and closing the valve orifices 34-36 when the valve is closed and an enlarged operating portion 43 that is exposed to the liquid within the manifold 13. In the embodiment of FIGS. 1 and 2 the portion 42 that engages the valve orifice is smaller in area than the operating portion 43. The two portions 42 and 43 are interconnected by a stem 44.

The operation of this first embodiment of FIGS. 1, 2 and 5 is as follows. The flowing liquid 11 such as water flows into the manifold 13 and into the first chamber 15 by way of the flow orifice 14. This orifice helps create back pressure in the manifold 13 and, acting on the valve portions 43, retains the valves in closed position as illustrated in FIG. 1 so that the liquid flow 11 is all directed in sequence through the first chamber 15, the first tube 16, the first elbow 24, through the second tube 17 and in a similar fashion through the successive tubes 18-21 by way of the successive chambers 27-29. From the last chamber 29 the liquid flows from the heat exchanger by way of the outlet pipe 30.

Where the heat exchanger is used to recover heat from a solar system, the incoming water 11 is used as the heat transfer medium from which heat is extracted by air flowing over the tubes 16-21 and between and through the tubes and the heat exchange fins 31.

In the event that the liquid flow 11 is interrupted either intentionally or accidentally so that the liquid flow 11 no longer provides valve closing pressure on the valves 37-39 the weight of liquid in the chambers 27-29 forces these valves downwardly to open position as illustrated in FIG. 5 permitting liquid to drain automatically from the tubes 16-21 into the chambers 15 and 27-29 and from there into the manifold 13 and then back in reverse flow through the inlet pipe 12.

The heat exchanger 10 of FIGS. 1 and 2 is arranged generally horizontally but with enough of an incline to permit gravity drainage from the tubes 16-21 into the chambers 15 and 27-29.

The embodiment of FIG. 3 is generally similar but here the heat exchanger 45 has tubes 46 arranged generally vertically with the upper ends of adjacent pairs of tubes interconnected by flow chambers 47, 48 and 49. These chambers are at the upper ends of the pairs of pipes 46 and there is an outlet chamber 52 also at the upper end of the last tube 46. The valves 37, 38 and 39 are the same as the similar valves shown in the first embodiment and operate in the same manner.

In the embodiment of FIG. 4 the heat exchanger 53 is also vertical and has tubes 46 the same as the tubes 46 of the FIG. 3 embodiment. In both embodiments adjacent tubes are interconnected by similar fins 31 that are the same as the fins in the first embodiment. It is of course true in all embodiments that only the confronting surfaces of adjacent tubes are interconnected by the fins 31 as the otuer fins are mounted on the outer tubes as shown.

In the FIG. 3 embodiment the manifold 13 is the same as the manifold of FIG. 1 and the chambers 15, 27, 28 and 29 are the same. Thus in both the embodiments of FIGS. 1, 2 and 5 and FIG. 3 the liquid flow 11 is in sequence through the chambers and tubes except in the embodiment of FIG. 3 reverse flow chambers 47, 48 and 49 are used instead of the reverse flow elbows 24–26. However, in both embodiments the pressure of the incoming liquid 11 in the manifold 13 by reason of the placement of the inlet orifice 14 causes the valves 37–39 to be held in closed position during the time of liquid flow. However, if for any reason the flow is interrupted the weight of the liquid in both embodiments opens these valves to permit reverse flow from the system.

In the embodiment of FIG. 4 the heat exchanger 53 has the same tube, fin and reverse flow chambers 47–49 as in FIG. 3 but in this embodiment the bottom reverse flow chambers 54, 55 and 56 are connected through orifices 57 to a bottom chamber 58 which in turn communicates through a valve orifice with a lateral extension chamber 60 located beside the inlet 61 to receive liquid therefrom. Located in this chamber 60 is a valve cage 63 similar to the valve cage 40 of the embodiment of FIG. 3 and containing a valve 64 similar to the valves 37–39 in the embodiments of FIGS. 1 and 3.

In this embodiment of FIG. 4 the pressure of the incoming liquid 11 in the lateral chamber 60 holds the valve 64 closed as shown so that the liquid is directed in series through the tubes 46 by way of the reverse flow chambers 47–49 and 54–56 and from there through the outlet pipe 65. In this embodiment of FIG. 4 there is provided only the single valve 64 for all three chambers 54–56 rather than a separate valve for each chamber as shown in the embodiments of FIGS. 2 and 3.

FIGS. 6-10 illustrate different embodiments of closure valves for closing the orifices 33 during liquid flow 11 through the system. In FIG. 6 this valve comprises a pressure distortable diaphragm 66. In FIG. 7 the valve comprises a hinged flap valve 67. In FIG. 8 there is also provided a hinged valve 68 that raises and lowers the valve stem 69. In FIG. 9 the valve is shown as a freely movable cone 70 movable within a confining cage 71. In FIG. 10 the valve is similar to FIG. 9 but here is in the form of a ball 72.

Having described our invention as related to the embodiments shown in the accompanying drawings, it is our intention that the invention be not limited by any of the details of description, unless otherwise specified, but rather be construed broadly within its limit and scope as set out in the appended claims.

We claim:

1. A self-draining heat exchanger, comprising: liquid flow means including a plurality of tubes arranged for sequential flow of liquid through said tubes; a liquid inlet means into a first said tube in the series; an outlet liquid means communicating with a last said tube of said series; reverse flow means adjacent to said inlet means for flow of liquid from the heat exchanger into and back through said inlet means when liquid flow is interrupted; pressure operated valve means for closing said reverse flow means by pressure of liquid flowing through said tubes; means for interrupting closing pressure on said reverse flow valve means when liquid flow is interrupted, thereby permitting the pressure of liquid within said heat exchanger to open said valves for reverse flow of liquid from said heat exchanger back through said inlet means; said tubes being parallel with adjacent ends interconnected by two sets of flow chambers, a first set being adjacent to said inlet means and a second set being adjacent to said outlet means; and a flow manifold at at least said first set of flow chambers, liquid flow opening means between at least said first set of chambers and said manifold, said manifold connected to said liquid inlet, and said valve means positioned in the opening to control flow through the opening responsive to the liquid pressure in said manifold.

2. The heat exchanger of claim 1 wherein there is provided a said valve means between the manifold and the liquid inlet.

3. The heat exchanger of claim 2 wherein said valve means is positioned in an auxiliary chamber communicating with both the liquid inlet means and the manifold in which said valve means is located.

4. The heat exchanger of claim 1 wherein said heat exchanger tubes are essentially horizontal.

5. The heat exchanger of claim 1 wherein said heat exchanger tubes are essentially vertical.

6. The heat exchanger of claim 1 wherein said tubes are essentially parallel and closely adjacent, the adjacent tubes having interconnecting serpentine fins for heat transfer between external fluid and liquid flowing through said tubes.

* * * * *